(12) United States Patent
Bihlmaier et al.

(10) Patent No.: US 12,214,455 B2
(45) Date of Patent: Feb. 4, 2025

(54) DEVICE FOR SEPARATING, TREATING AND REJOINING MULTIPIECE OBJECTS

(71) Applicant: Harro Hoefliger Verpackungsmaschinen GmbH, Allmersbach im Tal (DE)

(72) Inventors: Jonathan Bihlmaier, Allmersbach im Tal (DE); Robert Morschett, Allmersbach im Tal (DE); Garry Chambers, Allmersbach im Tal (DE); Michael Carl Junger, Allmersbach im Tal (DE); Pierre Armand Vincent Lemaire, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/357,830

(22) Filed: Jul. 24, 2023

(65) Prior Publication Data
US 2024/0024995 A1  Jan. 25, 2024

(30) Foreign Application Priority Data
Jul. 25, 2022  (EP) .................................... 22186783

(51) Int. Cl.
*B23P 19/04* (2006.01)
*B65B 7/28* (2006.01)
*B65B 43/60* (2006.01)
*B65B 65/00* (2006.01)

(52) U.S. Cl.
CPC .................................... *B23P 19/04* (2013.01)

(58) Field of Classification Search
CPC ......... B23P 19/04; B65B 43/60; B65B 43/50; B65B 7/2842; B65B 7/14; B65B 65/003; B65G 47/681; B65G 47/71; B65G 47/846; B67B 3/00; B67C 7/004; B67C 2007/0066
See application file for complete search history.

(56) References Cited

U.S. PATENT DOCUMENTS

| 5,743,069 | A | * | 4/1998 | Ansaloni | ................. | A61J 3/074 53/167 |
| 2018/0014999 | A1 | * | 1/2018 | Larimer | ................. | B65B 43/44 |

FOREIGN PATENT DOCUMENTS

DE          19708557 A1 * 10/1997  .............. A61J 3/074

* cited by examiner

*Primary Examiner* — Bayan Salone
(74) *Attorney, Agent, or Firm* — Walter Ottesen, P.A.

(57) ABSTRACT

A device for separating, treating and rejoining objects includes a process wheel for transporting bottom and cover pieces of the objects, a separating device, and an insert device for inserting the pieces in the process wheel. The process wheel has a first lower receiving ring with a first radius and a second upper receiving ring with a second smaller radius which are jointly rotatable as a unit. A wheel assembly is arranged between the separating device and the process wheel. The wheel assembly has a first lower wheel with bottom holders distributed around the periphery and a second upper wheel with cover holders for the cover pieces distributed around the periphery. The bottom holders and/or the cover holders in the circumferential direction are larger than the received bottom pieces or cover pieces such that, in operation, they surround the bottom or cover pieces with a compensation play.

17 Claims, 5 Drawing Sheets

DEVICE FOR SEPARATING, TREATING AND REJOINING MULTIPIECE OBJECTS

CROSS-REFERENCE TO RELATED APPLICATIONS

This application claims priority of European patent application no. 22 186 783.1, filed Jul. 25, 2022, the entire content of which is incorporated herein by reference.

BACKGROUND

In many areas of application, and in particular in pharmacy, multipiece objects with a bottom piece and a cover piece are used for example as containers, packaging or similar. Such objects are delivered as a unit with the cover piece pressed onto the bottom piece, as known for example from capsules. For filling or other treatment, the cover pieces are removed from the bottom pieces. After completed processing, the cover pieces are re-attached. Such processes are carried out in cyclic fashion in the prior art in order to allow performance of process steps such as opening and closing. Because of the alternating accelerated and decelerated movements, such cycling limits the process speed. The active acceleration and deceleration forces require a corresponding mechanical complexity and also corresponding drive power.

SUMMARY

It is an object of the disclosure to provide a device for separating, treating and rejoining multipiece objects which is suitable for continuous operation.

This object is, for example, achieved by a device for separating, treating and rejoining multipiece objects in continuous operation, wherein the objects each have a bottom piece and a cover piece which is separable from the bottom piece. The device includes: a process wheel configured to be driven in rotation about a rotational axis for receiving the bottom pieces and the cover pieces and for transporting the received bottom pieces and cover pieces along at least one processing station; a separating device configured to be driven in rotation for separating the cover pieces from the bottom pieces; an insert device configured to take the bottom pieces and the cover pieces from the separating device and inserting the bottom pieces and the cover pieces in the process wheel; the process wheel having a first lower receiving ring and a second upper receiving ring which are jointly rotatable as a unit; the first lower receiving ring having a first radius and being arranged concentrically to the rotational axis and having a plurality of bottom receivers for the bottom pieces; the second upper receiving ring having a second radius arranged concentrically to the rotational axis and having a plurality of cover receivers for the cover pieces; the second radius being smaller than the first radius; the plurality of bottom receivers being equal in number to the plurality of cover receivers; the insert device having a first lower insert wheel with bottom holders for the bottom pieces distributed around a periphery of the first lower insert wheel, and a second upper insert wheel with cover holders for the cover pieces distributed around a periphery of the second upper insert wheel; a wheel assembly arranged between the separating device and the process wheel; the wheel assembly having a first lower wheel with bottom holders for the bottom pieces distributed around a periphery of the first lower wheel, and a second upper wheel with cover holders for the cover pieces distributed around a periphery of the second upper wheel; and, at least one of the bottom holders and the cover holders in a circumferential direction of a correspondingly assigned one of the first lower wheel and the second upper wheel are larger than the correspondingly received bottom pieces or cover pieces such that, in operation, they surround the bottom pieces or cover pieces with a compensation play.

According to the disclosure, it is provided that the device includes a process wheel drivable in rotation about a rotational axis for receiving the bottom pieces and the cover pieces and for transporting them along at least one processing station, a separating device drivable in rotation for separating the cover pieces from the bottom pieces, and an insert device for taking the bottom pieces and cover pieces from the separating device and inserting the bottom pieces and the cover pieces in the process wheel. The process wheel has a first lower receiving ring and a second upper receiving ring which are jointly rotatable as a unit. The first receiving ring with a first radius is arranged concentrically to the rotational axis and has a specific number of bottom receivers for the bottom pieces. The second receiving ring with a second radius which is smaller than the first radius is arranged concentrically to the rotational axis and has the same number of cover receivers for the cover pieces. The insert device has a first lower insert wheel with bottom holders for the bottom pieces distributed around the periphery, and a second upper insert wheel with cover holders for the cover pieces distributed around the periphery.

A wheel assembly is arranged between the separating device and the process wheel, wherein the wheel assembly has a first lower wheel with bottom holders for the bottom pieces distributed around the periphery, and a second upper wheel with cover holders for the cover pieces distributed around the periphery. This wheel arrangement is in particular the above-mentioned insert device with the first lower insert wheel and the second upper insert wheel. However, an additional wheel assembly may also be provided and arranged for example between the separating device and the insert device, or between the insert device and the process wheel. In any case, the bottom holders and/or the cover holders in the circumferential direction of the respectively assigned first or second wheel, in particular thus the bottom holders and/or the cover holders in the circumferential direction of the respectively assigned first or second insert wheel, are larger than the respectively received bottom pieces or cover pieces such that, in operation, they surround the bottom pieces or cover pieces with a compensation play.

The disclosure is based on the concept of guiding the separated bottom and cover pieces jointly on a central process wheel along the proposed treatment stations, wherein however the objects are separated into individual bottom and cover pieces in an upstream separating device. In order to accommodate as high a number as possible of separate bottom and cover pieces on the process wheel with good use of space, a radial and axial position separation is provided: the bottom pieces are held in a radially outer receiving ring at the bottom in the axial direction, while the cover pieces are held in a radially inner receiving ring at the top in the axial direction. In this way, the cover pieces remain in the region of their bottom pieces and are continuously moved jointly because of a continuous rotational movement of the process wheel.

Because of the predefined angular speed of the process wheel, the different radii of the two receiving rings causes circumferential speeds of the bottom pieces and cover pieces which are equal in form but different in amount. On the input side of the process wheel, the objects as a whole initially have a speed which is the same for the bottom pieces and cover pieces. This delivery speed can in the best case be synchronised with only one of the two circumferential speeds of the receiving rings. The unsynchronised bottom or cover pieces must undergo a speed adaptation. For this, according to the disclosure, the insert device is provided. The defined compensation play allows the bottom pieces and/or the cover pieces to execute a decelerating or accelerating speed jump at the moment of transfer and hence be adapted to the actual speed of the following receiving ring.

Overall therefore, a continuous and non-intermittent operation of at least the central process wheel is achieved, wherein the objects as a whole—and also divided into bottom and cover pieces—execute almost equivalent movements with only slight speed adaptations.

It may be suitable to set the revolutionary speed of the separating device to the revolutionary speed of the first lower receiving ring, which would then mean that the upper cover pieces would have to be decelerated. Alternatively, it may also be suitable to set the revolutionary speed of the separating device somewhere between the two different revolutionary speeds of the two receiving rings, whereby the cover pieces need only be slightly decelerated and the bottom pieces only slightly accelerated. It is however preferred that the second upper insert wheel of the insert device, and the second upper receiving ring of the process wheel, are set to the same circumferential speed as one another and to a same circumferential speed of the separating device, and that the cover holders of the second upper insert wheel are adapted to the size of the cover pieces without compensation play. In this way, the cover pieces retain their speed unchanged on passage through the separating device, the insert device and the process wheel. As a result, no compensation play for speed adaptation is required. Only the bottom pieces undergo a speed adaptation in the form of acceleration. In operation, it has been found that such acceleration can be handled with greater process reliability in comparison with deceleration.

It may be suitable to carry out the speed jump on transfer from the insert device to the process wheel, or also divide this over the transfer to the process wheel. Preferably, the first lower insert wheel of the insert device and the first lower receiving ring of the process wheel are set to a same circumferential speed as one another. Here, the bottom holders of the insert device are larger than the received bottom pieces such that, in operation, they surround the bottom pieces with the compensation play. Also, lower object holders of the separating device are larger than the received bottom pieces such that, in operation, they surround the bottom pieces with a compensation play. The accelerated speed jump is thus carried out on transfer of the bottom pieces from the separating device to the insert device. It may however be suitable to carry out the speed jump on transfer from the insert device to the process wheel, or also divide this proportionally over the collection from the separating device and the transfer to the process wheel. Since there is no speed jump on transfer to the lower receiving ring, the associated bottom receivers need have no compensation play. The omission of compensation play at this point means that the bottom pieces are held precisely positioned and can be conducted along the processing stations.

The number of cover holders of the second insert wheel can advantageously be greater, and in particular greater by four, than the number of bottom holders of the first insert wheel. This allows a compact configuration. In the circumferential direction there is indeed a positional offset between the bottom pieces and the respective assigned cover pieces on the process wheel. This is however so slight that on transfer through the output lock, it can easily be reversed without great effort so that all bottom pieces again have their original cover pieces.

Preferably, the separating device is configured for continuous and non-intermittent operation. One condition for this is firstly that the objects each have a vertical axis, wherein the cover piece is removable from the bottom piece primarily in the direction of the vertical axis. For this, the separating device has two separating wheels arranged one above the other and each with a rotational axis, wherein the rotational axes of the separating wheels intersect one another and are tilted relative to one another by a tilt angle. The lower separating wheel has lower object holders for the bottom pieces distributed over the periphery, wherein the upper separating wheel has upper object holders for the cover pieces distributed over the periphery. The two separating wheels have a same pitch circle diameter and are continuously driven in rotation jointly with the same angular speed. Because of the tilt angle between the axes, the upper and lower object holders have a cyclic spacing change between a minimal axial spacing and a maximum axial spacing, and also undergo a relative tilt movement at the same time. The objects are introduced in the region of the minimal spacing. Because of the subsequently enlarging spacing, the cover pieces are removed from the bottom pieces or separated in a pivot movement and can be transferred separately to the following process station in the region of the maximal spacing. This takes place with little mechanical complexity in a continuous rotational movement of the separating wheels so that high process speeds are possible.

In an embodiment, a supply wheel for individual objects is provided which has a rotational axis and is arranged in front of the separating device. In top view, the separating device has a location with minimal vertical spacing of the lower and upper object holders and a location with maximal vertical spacing of the lower and upper object holders. The first lower insert wheel and the second upper insert wheel of the insert device each have a rotational axis. The rotational axis of the supply wheel, the rotational axes of the separating wheels, the locations with minimal and maximal vertical spacing of the lower and upper object holders, and the rotational axis of at least one insert wheel, lie on a straight connecting line. This ensures that the initially still joined objects are supplied at the location of the minimal vertical spacing of the separating device and from there cover the maximal separating travel available for removal of the cover piece from the bottom piece. At the location of the maximal vertical spacing, the separation has been completed and the bottom piece and/or cover piece can be removed without collision.

In an embodiment, the device according to the disclosure has a joining device for joining together the separated bottom pieces and cover pieces, and an extraction device for removing the bottom pieces and cover pieces from the process wheel and for transferring the bottom pieces and cover pieces to the joining device, wherein the extraction device has a first lower extraction wheel with bottom holders for the bottom pieces distributed over the periphery, and a second upper extraction wheel with cover holders for the cover pieces distributed over the periphery. A wheel assembly is arranged between the process wheel and the joining device, wherein the wheel assembly includes a first lower wheel with bottom holders for the bottom pieces distributed over the periphery and a second upper wheel with cover holders for the cover pieces distributed over the periphery.

This wheel assembly is in particular the above-mentioned extraction device with the first lower extraction wheel and the second upper extraction wheel. However, an additional wheel assembly may also be provided and for example arranged between the process wheel and the extraction device, or between the extraction device and the joining device. In any case, the bottom holders and/or the cover holders in the circumferential direction of the respectively assigned first or second wheel are larger than the respectively received bottom pieces or cover pieces such that, in operation, they surround the bottom pieces or cover pieces with a compensation play.

At this point, similarly to the above statements concerning the insert device, although the bottom and cover pieces are moved on the central process wheel with different circumferential speeds, for the following joining device equal speeds must be used. As in the insert device, here again a compensation play is used which allows a speed jump compensating for the above-mentioned speed difference on collection and/or transfer.

Here too, a deceleration of the faster lower pieces, or a combination of deceleration of the lower pieces and acceleration of the cover pieces may be made in order to achieve the desired speed adjustment. Preferably, the first lower extraction wheel of the extraction device and the first lower receiving ring of the process wheel are set to the same circumferential speed as one another and to a same circumferential speed of the joining device. As a result, the bottom pieces retain their speed unchanged. This allows the bottom holders of the first lower extraction wheel to be adapted to the size of the bottom pieces without compensation play.

As in the insert device, here again the other pieces, that is, here the cover pieces, must undergo a speed adaptation. In this case, this must be an acceleration which is regarded as more process-reliable and hence advantageous in comparison with an also possible, optional deceleration of the bottom pieces. This accelerating speed jump may be carried out on transfer of the bottom and cover pieces from the process wheel to the extraction device, or also divided proportionally over the following transfer to the joining device. Preferably however, the second upper extraction wheel of the extraction device and the second upper receiving ring of the process wheel can be set to a same circumferential speed as one another. The cover holders are here larger than the received cover pieces such that, in operation, they surround the cover pieces with the compensation play, wherein the upper object holders of the joining device are larger than the received cover pieces such that, in operation, they surround the cover pieces with a compensation play. Here therefore, the accelerating speed jump takes place exclusively on transfer from the extraction device to the joining device. The cover receivers of the second receiving ring therefore need no compensation play and may be adapted precisely in shape and size to the cover pieces. The cover pieces can be positioned and held exactly in the correct position in the cover receivers while they are moved along the treatment stations.

In a embodiment, the number of bottom holders of the first extraction wheel is equal to the number of cover holders of the second extraction wheel. In such an embodiment, both extraction wheels must be positioned with mutually offset rotational axes such that they can cooperate firstly with the joining device and secondly with the receiving rings of the process wheel, situated on the different radii. This axial offset may be selected such that the above-described positional offset of the cover pieces relative to their original bottom pieces on the process wheel is eliminated again. All bottom pieces can again be joined to their original cover pieces. This is particularly important when the bottom and cover pieces must execute multiple revolutions on the process wheel. Then in fact all bottom pieces can be provided with their cover pieces. Otherwise, on multiple revolutions, some bottom pieces and some cover pieces would no longer find a partner on subsequent output and would have to be rejected.

Similarly to the above-defined separating device, the same configuration may also be used for the joining device insofar as the cover pieces can be placed on the bottom pieces again in the direction of the vertical axis. Accordingly, the joining device has two joining wheels arranged one above the other and each with a rotational axis, wherein the rotational axes of the joining wheels intersect one another and are tilted relative to one another by a tilt angle, wherein the first lower joining wheel has lower object holders for the bottom pieces distributed over the periphery, and wherein the second upper joining wheel has upper object holders for the cover pieces distributed over the periphery. Here, the separated bottom and cover pieces are received in the region of the maximal axial spacing of the object holders. The subsequent reduction in the spacing causes the cover pieces to be placed onto the bottom pieces or pushed on in a pivot movement. In the region of the minimal axial spacing, the objects are completely re-assembled or joined and are conducted onward from there.

Similarly to the above-defined separating device, in an embodiment, a transfer wheel for individual objects is provided which has a rotational axis and is arranged behind the joining device. In top view, the joining device has a location with maximal vertical spacing of the lower and upper object holders and a location with minimal vertical spacing of the lower and upper object holders. The first lower extraction wheel and the second upper extraction wheel of the extraction device each have a rotational axis. The rotational axis of the transfer wheel, the rotational axes of the joining wheels, the locations with minimal and maximal vertical spacing of the lower and upper object holders, and the rotational axis of at least one extraction wheel, lie on a straight connecting line. This ensures that the bottom piece and/or cover piece can be supplied to the separating device without collision at the location of maximal vertical spacing, and from there cover the maximum axial joining travel available for placing the cover piece on the bottom piece. At the location of minimal vertical spacing, the joining is complete and the assembled object can be removed.

The separating device and the joining device are here described in connection with the complete device according to the disclosure. In addition, however, they each constitute an independent disclosure and may be used as an autonomous separating device and/or as an autonomous joining device in other fields.

Advantageously, an output lock station can be positioned in the circumferential region of the process wheel, which has lower output lock means and upper output lock means, wherein the lower output lock means can be brought into active connection on the bottom pieces situated in the first receiving ring, and wherein the upper output lock means can be brought into active connection on the cover pieces situated in the second receiving ring. This allows selective holding or output of the bottom and cover pieces so that, optionally, a single revolution is possible followed by a controlled output. Preferably however, the lower output lock means and the upper output lock means can be controllable such that the bottom pieces and assigned cover pieces execute multiple revolutions together with the process wheel. Thus if required, a multiple revolution with freely selectable number of revolutions can be carried out. This allows repeated passage of the bottom and/or cover pieces past the individual processing stations in order for example to carry out a multiple coating application with subsequent drying step, wherein output takes place only after a sufficient number of repetitions.

BRIEF DESCRIPTION OF DRAWINGS

The invention will now be described with reference to the drawings wherein.

DETAILED DESCRIPTION

Figure 1:
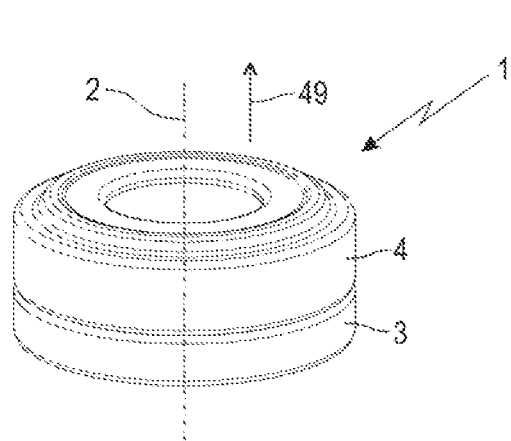
FIG. 1 shows in a perspective view a two-piece object with a bottom piece and a cover piece.

FIG. 1 shows in a perspective view a multipiece object 1 which is to be separated, treated and rejoined using the device described in more detail below. The object 1 has a vertical axis 2 and includes at least a bottom piece 3 and a cover piece 4. The cover piece 4 can be separated from the bottom piece 3, for which in the embodiment shown it can be detached upward in the direction of the vertical axis 2 corresponding to an arrow 49.

Figure 2:
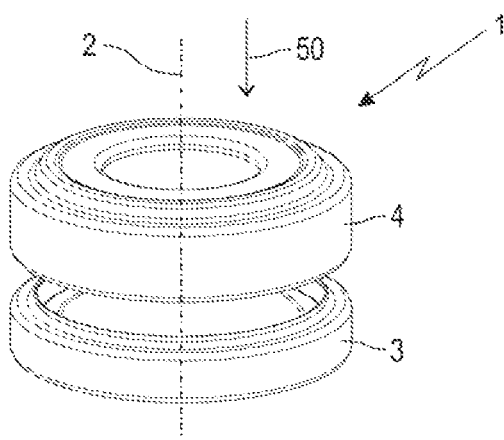
FIG. 2 shows in a perspective view the object from FIG. 1 with cover piece removed upward.

FIG. 2 shows in a perspective view the object 1 from FIG. 1 in separated state. The cover piece 4 has been lifted off the bottom piece 3 vertically in the direction of the vertical axis 2, and can be refitted onto the bottom piece 3 in the opposite direction corresponding to an arrow 50. In the embodiment of FIGS. 1 and 2, the bottom piece 3 and the cover piece 4 each have a cylindrical base form. However other contours, for example, polygonal or similar, may also be suitable.

Figure 3:
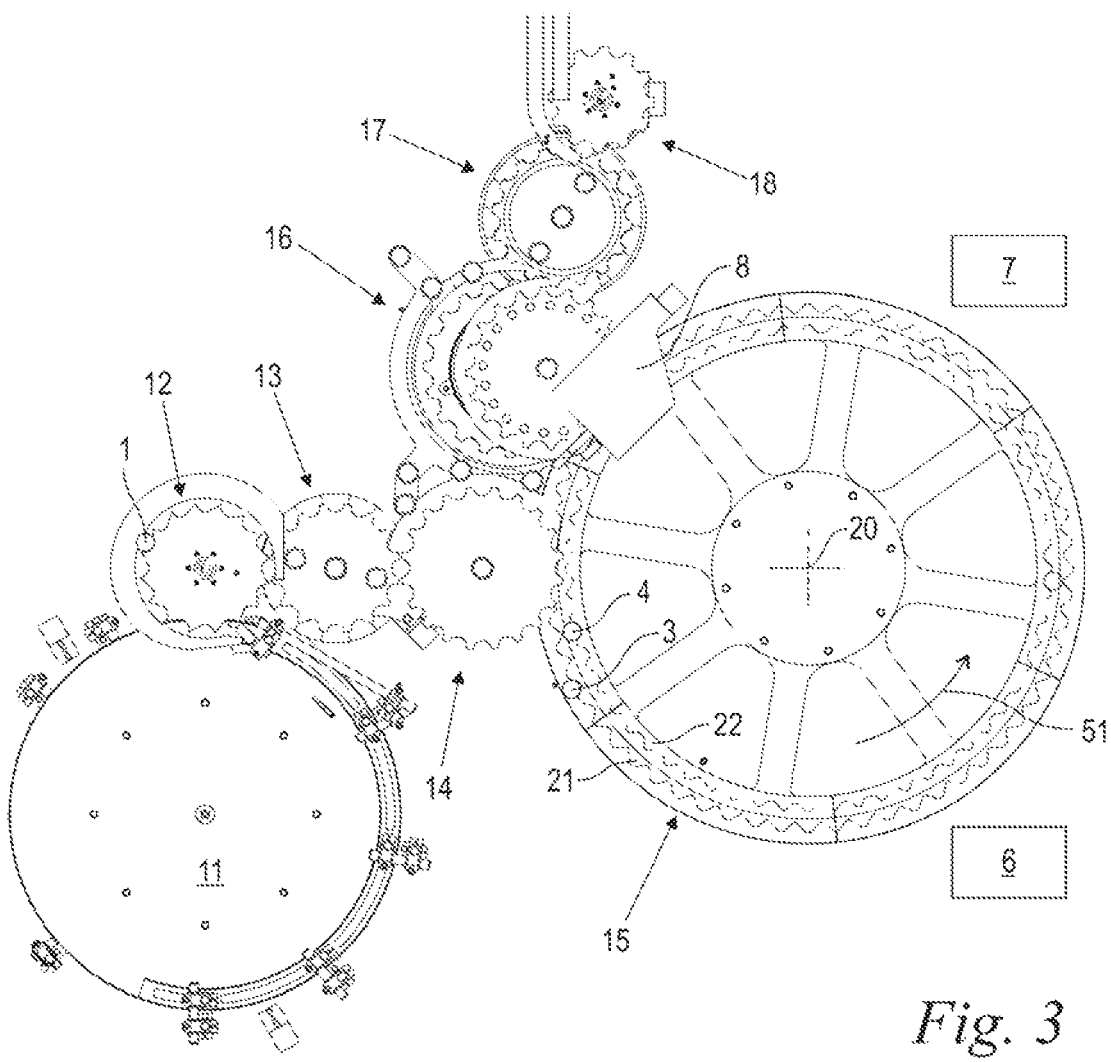
FIG. 3 shows in a top view an embodiment of a device configured according to the disclosure including a supply table, an isolating wheel, a separating device, an insert device, a central process wheel, an extraction device, a joining device and a transfer wheel.

FIG. 3 shows in a top view an embodiment of a device configured according to the disclosure for separating, treating and rejoining the multipiece objects 1 from FIGS. 1 and 2. The device includes a supply table 11 on which the objects 1, with assembled bottom and cover pieces 3, 4 (FIGS. 1 and 2), are collected and supplied to a downstream supply wheel 12 acting as isolating wheel. The objects 1 are transferred individually by the supply wheel 12 to a downstream separating device 13, in which the cover pieces 4 and bottom pieces 3 are separated from one another in the vertical direction according to the illustration in FIG. 2, that is, transversely to the drawing plane of FIG. 3, in a pivot movement described in more detail below.

The bottom pieces 3 and cover pieces 4, separated from one another in this fashion, are transferred from the separating device 13 to a downstream insert device 14, which in turn transfers the separated bottom pieces 3 and cover pieces 4 to a downstream process wheel 15. For this, the process wheel 15 is provided with a first lower receiving ring 21 for the bottom pieces 3 and a second upper receiving ring 22 for the cover pieces 4. The process wheel 15 conducts the bottom pieces 3 and cover pieces 4 past at least one processing station, here for example two processing stations 6, 7 which are indicated purely schematically. After processing, the bottom pieces 3 and cover pieces 4 are transferred via an output lock station 8 to an extraction device 16. The extraction device 16 forms pairs of bottom pieces 3 and cover pieces 4 and transfers these to the joining device 17, which places the cover pieces 4 back on the bottom pieces 3 and, by a transfer wheel 18, supplies them as closed objects 1 for further processing, for example, sealing, packing or similar.

The device is configured as a whole for continuous, that is, non-intermittent operation at least in the region of the process wheel 15, wherein the process wheel 15 can be driven in rotation about a vertical rotational axis 20 corresponding to an arrow 51. This means that the bottom pieces 3 and cover pieces 4 are moved continuously in the region of the process wheel 15, or continuously past the processing stations 6, 7. In the embodiment shown, the processing stations 6, 7 act only on the bottom pieces 3, while the cover pieces 4 remain unprocessed. However, a configuration may also be suitable in which, alternatively or additionally, the cover pieces 4 also undergo processing. As an example, here only two processing stations 6, 7 are indicated. However, a different number may also be advantageous.

It may be suitable for the bottom pieces 3 and cover pieces 4 to be output at the output lock station 8 directly after first passing the processing stations 6, 7, and supplied to the joining device 17 by the extraction device 16. In this case, the supply wheel 12, the separating device 13, the insert device 14, the extraction device 16 and the joining device 17 work continuously by rotation about substantially vertical rotational axes. The objects 1 are thus continuously separated, supplied, processed, output and joined.

In the present case however, the device is configured for multiple revolutions of the bottom pieces 3 and cover pieces 4 by the process wheel 15. For this, firstly the process wheel 15 is provided with a specific number of bottom pieces 3 and the same number of cover pieces 4, wherein then the supply of new objects 1 is interrupted. Up to this time, the supply wheel 12, separating device 13 and insert device also work continuously, that is, non-intermittently. On insertion, not all receiving sites of the process wheel 15 need be occupied, and gaps may remain free. Preferably however, all receiving sites of the process wheel 15 are filled with bottom pieces 3 and cover pieces 4, without gaps, wherein here for example 60 receiving sites are provided in each case. In the embodiment shown, firstly at the processing station 6, a coating is applied in the central region of the bottom pieces 3, while in the subsequent processing station 7, the coating is dried. Because of the multiple revolutions, this is repeated often enough for the coating to be formed and dried to the desired extent. As soon as this has occurred, the stock of bottom pieces 3 and cover pieces 4 on the process wheel is output at the output lock station, transferred by the extraction device 16 to the joining device 17, and there assembled into finished objects 1. From the time of output, the extraction device 16 and joining device 17 work continuously, that is, non-intermittently. This is followed by refilling of the continuously rotating process wheel 15 with bottom pieces 3 and cover pieces 4 according to the above-described procedure, wherein again gap-free filling is possible.

Figure 4:
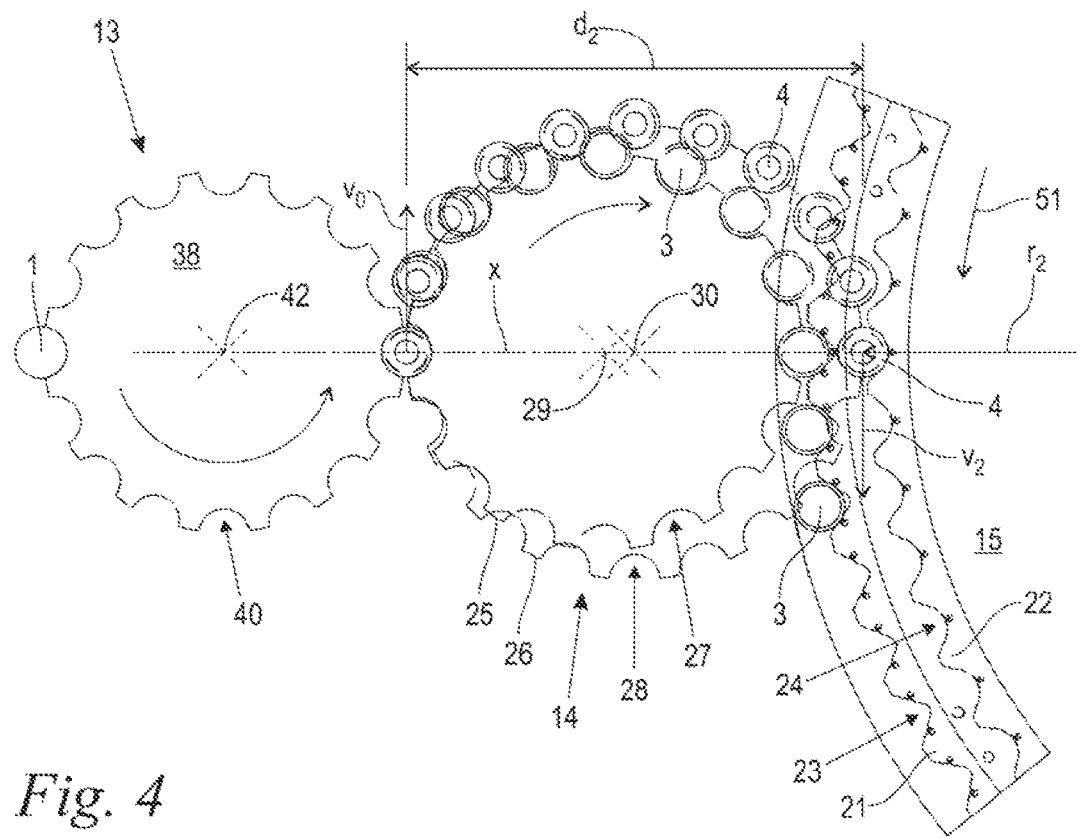
FIG. 4 shows in an enlarged detail view the device in FIG. 3 in the region of the separating device and the insert device, wherein the insert device includes two different insert wheels.
Figure 5:
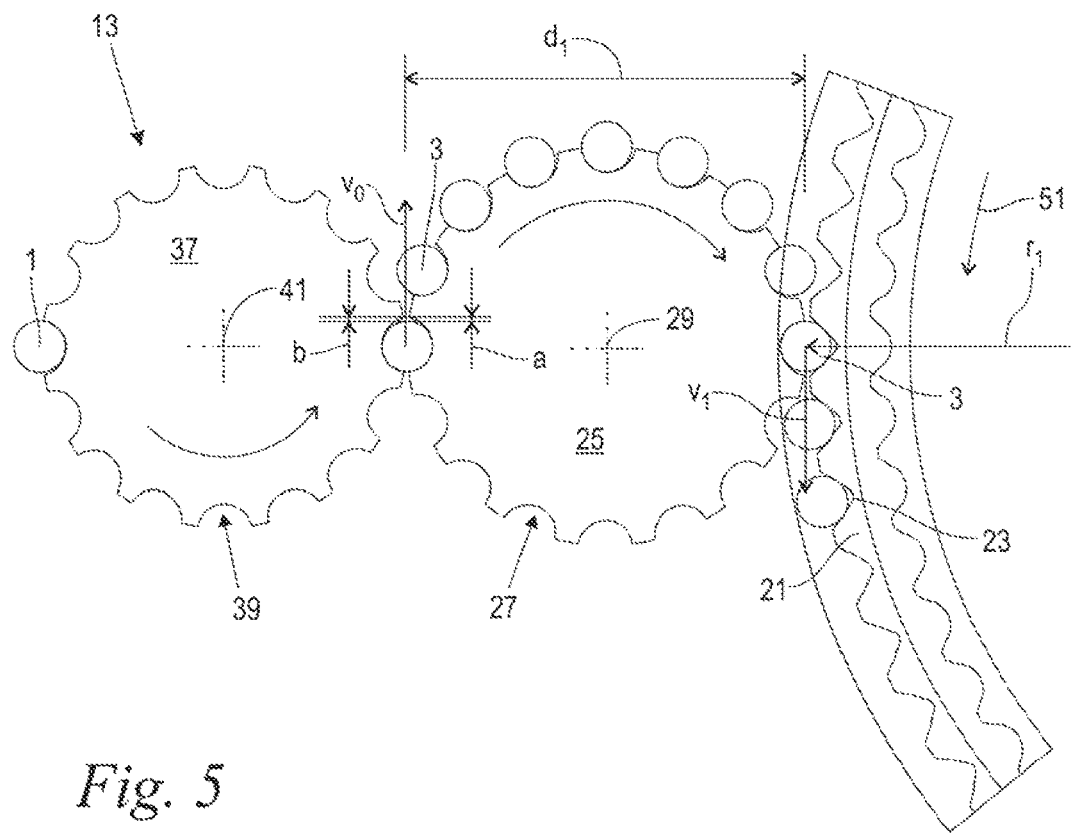
FIG. 5 shows the assembly from FIG. 4 in the region of the lower insert wheel in cooperation with bottom pieces, forming a compensation play.

FIG. 4 shows in an enlarged detail illustration the device from FIG. 3 in the region of the separating device 13, the insert device 14 and the region of their engagement in the process wheel 15. The same region is also shown in FIG. 5 with clarification of additional details. A combined view of FIGS. 4 and 5 shows the structural configuration and function as follows: the separating device 13 includes a first lower separating wheel 37 (FIG. 5) and a second upper separating wheel 38 (shown in FIG. 4), which is situated directly above the first lower separating wheel 37 (FIG. 5). The second upper separating wheel 38 can be driven in rotation about a vertical rotational axis 42, and on its circumference includes upper object holders 40 which are shaped like circle segments and open radially to the outside. Similarly, the first lower separating wheel 37 (FIG. 5) can be driven in rotation about an upright, almost vertical rotational axis 41, and on its circumference is provided with lower object holders 39 shaped approximately as circle segments. The lower object holders 39 and upper object holders 40 grip the objects 1 and separate them into bottom pieces 3 and cover pieces 4, as described in more detail below in connection with FIG. 7.

The insert device 14 includes a first lower insert wheel 25 with a vertical rotational axis 29, and a second upper insert wheel 26 with a vertical rotational axis 30. The first lower insert wheel 25 is provided on its circumference with bottom holders 27 of approximately circle segment shape, while the second upper insert wheel 26 is provided on its circumference with cover holders 28 of approximately circle segment shape.

The first receiving ring 21 and the second receiving ring 22 are arranged concentrically to the rotational axis 20 (FIG. 3) of the process wheel 15, and together with the process wheel 15 form a rotationally fixedly connected unit which is driven in rotation as one assembly. Corresponding to the height difference between the first lower insert wheel 25 and the second upper insert wheel 26, the second receiving ring 22 lies a corresponding amount higher than the first lower receiving ring 21, so that the first lower receiving ring 21 can take the bottom pieces 3 from the first lower insert wheel 25, while the second upper receiving ring 22 can take the cover pieces 4 from the second upper insert wheel 26. On the radial outside, the first receiving ring 21 has a specific number of bottom receivers 23 for the bottom pieces 3, wherein in the embodiment shown here, a total of 60 bottom receivers 23 are provided which are distributed evenly over the circumference. Similarly, the second upper receiving ring 22 is provided with the same number of cover receivers 24 for the cover pieces 4 which are open radially towards the outside.

The first lower receiving ring 21 together with its bottom receivers 23 is configured such that the bottom pieces 3 received and held therein lie on a first radius $r_1$ relative to the rotational axis 20 (FIG. 3). Similarly, the second upper receiving ring 22 with its cover receivers 24 is configured such that the cover pieces 4 held therein lie on a second radius $r_2$ which is smaller than the first radius $r_1$. The difference between the two radii $r_1$, $r_2$ is selected such that the radially inner cover pieces 4 do not in any way cover the radially further outwardly situated bottom pieces 3, and the processing stations 6, 7 (FIG. 3) have free access to the bottom pieces 3. As a result, for a given rotation speed or angular speed of the process wheel 15, the bottom pieces 3 are moved with a circumferential speed v 1 corresponding to the first radius $r_1$, while the cover pieces 4 lying radially further inward are moved with a correspondingly lower circumferential speed v 2 because of the smaller radius $r_2$.

The other process speeds are adapted to these different circumferential speeds $v_1$, $v_2$ as follows: in the embodiment shown, the rotational speeds of the second upper insert wheel 26 of the insert device 14 and of the process wheel 15 are matched to one another such that they move the cover pieces 4 with the same circumferential speed $v_2$. The rotational speed of the separating device 13 or upper second separating wheel 38 is matched to this, so the objects 1 or cover pieces 4 are moved with a circumferential speed $v_0$ which is equal to the above-mentioned circumferential speed $v_2$.

The speed ratios in the region of the lower separating wheel 37, lower insert wheel 25 and lower receiving ring 21 are slightly different. The rotational speed of the first lower insert wheel 25 is matched to the rotational speed of the process wheel 15 such that both transport the bottom pieces 3 with the same circumferential speed $v_1$. This is however greater than the above-described circumferential speed $v_2$ of the cover pieces 4. However, according to the function description given below in connection with FIG. 8, the two separating wheels 37, 38 of the separating device 13 with the same diameter are moved with the same rotational speed. The lower separating wheel 37 thus transports the bottom pieces 3 with the same circumferential speed $v_0$ with which the cover pieces 4 are transported by the upper separating wheel 38. As a result, during transport in the lower separating wheel 37 with circumferential speed $v_0$, the cover pieces 4 move more slowly than subsequently in the lower insert wheel 25 with the circumferential speed $v_1$. On transfer of the bottom pieces 3 from the lower separating wheel 37 to the lower insert wheel 25, a speed jump thus occurs from the initial circumferential speed $v_0$ to the subsequent circumferential speed $v_2$.

FIG. 5 therefore shows that the bottom holders 27 are substantially but not precisely adapted to the peripheral contour of the bottom pieces 3. Rather, the bottom holders 27 of the assigned lower insert wheel 25 are larger in the circumferential direction than the respectively received bottom pieces 3 such that, in operation, they surround the bottom pieces 3 with a compensation play a. Accordingly, the same applies to the lower object holders 39 of the lower separating wheel 37 which surround the bottom pieces 3 with a compensation play b acting in the circumferential direction. The compensation play a, in particular in cooperation with the compensation play b, allows an acceleration of the bottom pieces 3 from their initial speed $v_0$ to the higher speed $v_1$ during transfer from the lower separating wheel 37 to the lower insert wheel 25. In the configuration shown, this acceleration does not take place for the cover pieces 4, so the cover holders 28 of the upper insert wheel 26 are adapted to the size and shape of the cover pieces 4 without such compensation play. Accordingly, the same applies to the upper object holders 40 of the upper separating wheel 38, which are adapted to the size and shape of the cover pieces 4 without the above-mentioned compensation play b. However, an additional wheel assembly may also be provided for the performance of the speed jump and arranged for example between the separating device 13 and the insert device 14, or between the insert device 14 and the process wheel 15, wherein then the compensation play a—and in some cases also the compensation play b—is used similarly.

It is evident from the illustration in FIG. 4 that the two insert wheels 25, 26 have a respective assigned rotational axis 29, 30. In the top view of the embodiment shown, these rotational axes 29, 30 lie on a theoretical straight connecting line x which runs through the rotational axis 20 of the process wheel 15 (FIG. 3) and the rotational axes 41, 42 of the separating wheels 37, 38. The two separating wheels 37, 38 have the same diameter and the same number of lower and upper object holders 39, 40, while the radius $r_2$ of the upper receiving ring 22 is smaller than the radius $r_1$ of the lower receiving ring 21. To bridge this radius difference, the second insert wheel 26 has a diameter d 2 which is larger, by the difference between the first and second radii $r_1$, $r_2$, than a diameter d 1 of the first insert wheel 25. The result is a positionally precise collection of the bottom pieces 3 and cover pieces 4 by the separating device 13, and a positionally correct transfer thereof to the first receiving ring 21 or smaller second receiving ring 22. Analogously to the different diameters $d_1$, $d_2$, the number of cover holders 28 of the second insert wheel 26 is greater than the number of bottom holders 27 of the first insert wheel 25. In the embodiment shown, the second insert wheel 26 has twenty cover holders 28, while the first insert wheel 25 has only sixteen bottom holders 27. The number of cover holders 28 is thus greater by four than the number of bottom holders 27. As a result, and as illustrated in FIG. 4, the individual bottom pieces 3 come to lie two places in front of the associated cover pieces 4 in the rotational direction in the process wheel 15. In the context of the disclosure, different configurations are however also possible, wherein the rotational axes 29, 30 of the insert wheels 25, 26 do not lie on the connecting line x, and wherein other diameters $d_1$, $d_2$ and other numbers of bottom holders 27 and cover holders 28 are selected for geometric or kinematic adaptation.

Figure 6:
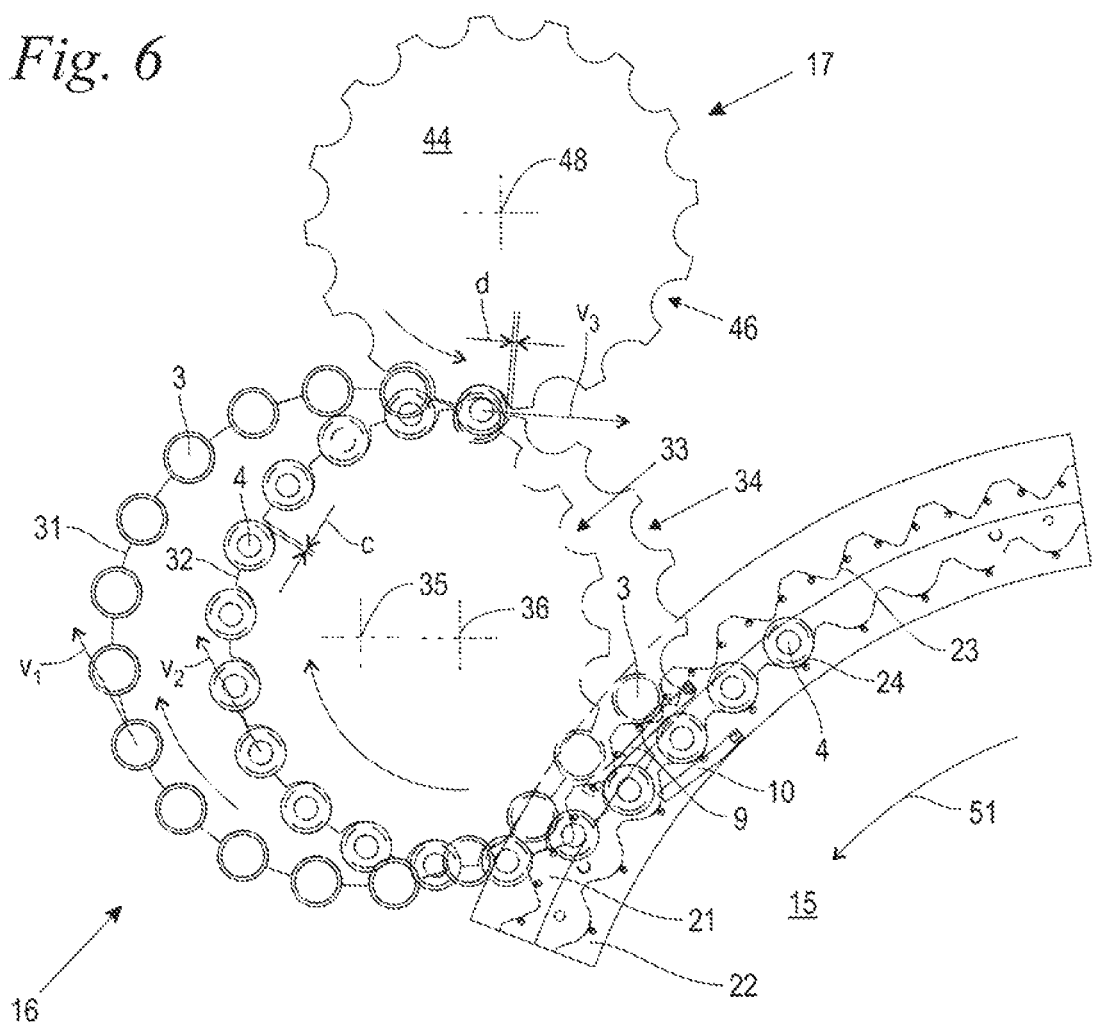
FIG. 6 shows in an enlarged detail illustration the device from FIG. 3 in the region of the extraction device and the joining device, wherein the extraction device includes two axially offset extraction wheels, and wherein the upper extraction wheel cooperates with cover pieces, forming a compensation play.

FIG. 6 shows, in an enlarged detail illustration, the device from FIG. 3 in the region of the joining device 17, the extraction device 16 and their interaction with the process wheel 15 in the region of the output lock station 8. The output lock station 8 includes lower output lock means 9 situated in the region of the first receiving ring 21, and upper output lock means 10 arranged in the region of the upper receiving ring 22. The output lock means 9, 10 are each configured as pivot arms and positioned such that in their inwardly pivoted state they are inactive, and in their outwardly pivoted state they act on the bottom pieces 3 or cover pieces 4 respectively. Accordingly, the outwardly pivoted, lower output lock means 9 push the bottom pieces 3, held in the lower receiving ring 1, radially outward from their bottom receivers 23 so that they enter the action region of the extraction device 16. Accordingly, the same applies to the upper output lock means 10 which, in outwardly pivoted state, push the cover pieces 4, held in the second upper receiving ring 21, radially outward from their cover receivers 24 and transfer them to the extraction device 16. The lower output lock means 9 and upper output lock means 10 are controllable via a control unit (not shown here) such that the bottom pieces 3 and assigned cover pieces 4 firstly execute several revolutions together with the process wheel 15, and are only then output.

Like the insert device 14 (FIGS. 4, 5), the extraction device 16 includes a first lower extraction wheel 31 which can be driven in rotation about a rotational axis 35, and a second upper extraction wheel 32 which can be driven in rotation about a rotational axis 36. The first lower extraction wheel 31 is provided on its circumference with radially outwardly open bottom holders 33 of circle segment shape, while the second upper extraction wheel 32 is provided on its circumference with radially outwardly open cover holders 34 of approximately circle segment shape. The two extraction wheels 31, 32 have a mutual height offset which corresponds to the height offset of the second receiving ring 22 from the first receiving ring 21. The extraction wheels 31, 32 are arranged such that with their bottom holders 33 or cover holders 34, they can receive the bottom pieces 3 or cover pieces 3 ejected at the output lock station 8.

Figure 9:
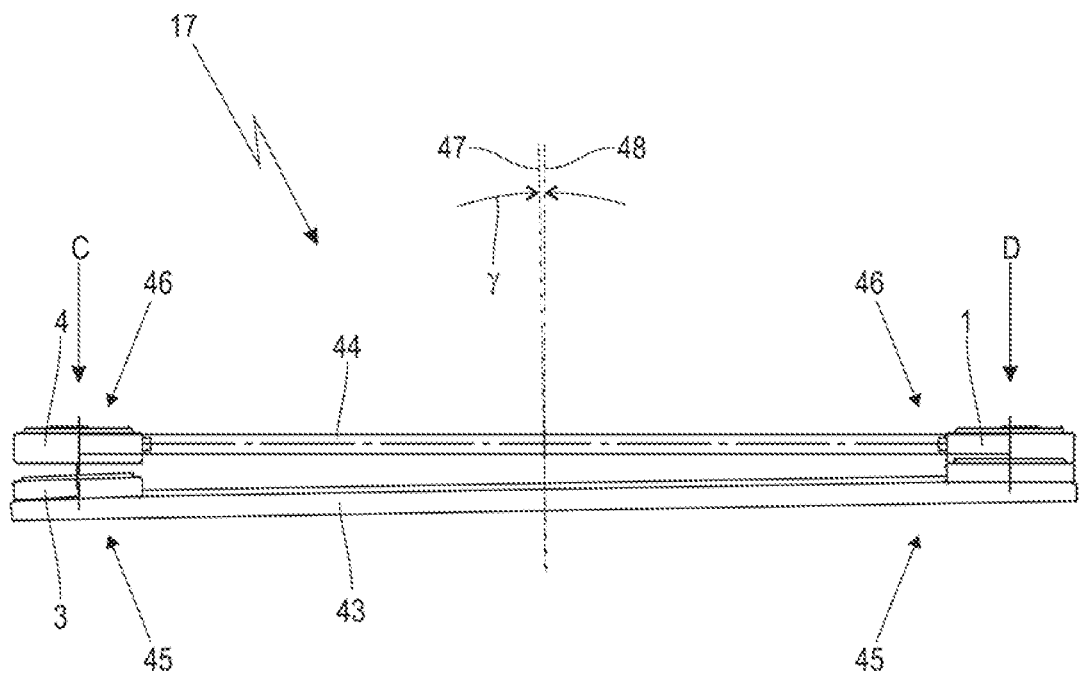

The joining device 17 substantially corresponds in its fundamental structure to the separating device 13 described in connection with the FIGS. 4 and 5. A combined view of FIGS. 6 and 9 shows that the joining device 17 includes a first lower joining wheel 43 with an upright, almost vertical rotational axis 47, and a second upper joining wheel 44 with a vertical rotational axis 48. The two joining wheels 43, 44 on their outer circumferences are provided with lower or upper object holders 45, 46 respectively and have a same diameter. They are operated at the same rotation speed so that the bottom pieces 3 or cover pieces 4 held in the object holders 45, 46 are moved with the same circumferential speed $v_3$.

The rotational speed of the first lower extraction wheel 31 of the extraction device 16 is adapted to the rotational speed of the process wheel 15 such that the bottom pieces 3, delivered by the first lower receiving ring 21 with circumferential speed $v_1$, are transported on to the bottom holders 33 of the first lower extraction wheel 31 while retaining this circumferential speed $v_1$, that is, without acceleration or deceleration. The rotational speed of the joining device 17 is adapted to this such that its circumferential speed $v_3$ is equal to the above-mentioned circumferential speed $v_1$. The bottom pieces 3 are thus collected and transported on by the lower joining wheel 43 (FIG. 9) while retaining the circumferential speed $v_1=v_3$, that is, without acceleration or deceleration.

Similarly, the rotational speed of the second upper extraction wheel 32 is adapted to the rotational speed of the process wheel 15 such that the cover pieces 4, delivered by the second receiving ring 22 with the lower circumferential speed $v_2$, are collected by the second upper extraction wheel 32 and transported onward in the cover holders 34 while retaining this circumferential speed $v_2$.

This second circumferential speed $v_2$ is however lower than the circumferential speed $v_3$ of the joining device 17. On transfer of the cover pieces 4 from the upper extraction wheel 32 to the upper joining wheel 44, therefore a speed jump occurs in which the cover pieces 4 are accelerated from the second circumferential speed $v_2$ to the third circumferential speed $v_3$. To allow this, the cover holders 34 of the second upper extraction wheel 32 are adapted only approximately to the peripheral contour of the cover pieces 4. They are formed approximately as circle segments corresponding to the diameter of the cover pieces 4, wherein however they are larger than the received cover pieces 4 such that, in operation, they surround the cover pieces 4 with a compensation play c active in the rotational direction. Accordingly, the same also applies to the upper object holders 46 of the upper joining wheel 44, which also surround the received cover pieces 4 in operation with a compensation play d acting in the rotational direction. The compensation play c, in particular in cooperation with the compensation play d, allows acceleration of the cover pieces 4 during transfer from the cover holders 34 of the upper extraction wheel 32 to the upper object holders 46 of the upper joining wheel 44. Similarly to the above-described region of the insert device 14, here too in the region of the extraction device 16, an additional wheel assembly may be provided for performing the speed jump and for example arranged between the process wheel 15 and the extraction device 16, or between the extraction device 16 and the joining device 17, wherein then the compensation play c—and in some cases the compensation play d—is used similarly.

It is clear from the above statements that the bottom pieces 3 and cover pieces 4 either retain their speed or are accelerated on their passage from the supply wheel 12 through to the joining device 17 (FIG. 3), which compensates for the different circumferential speeds $v_1$, $v_2$ of the receiving rings 21, 22 necessarily present because of the different radii $r_1$, $r_2$. In the embodiment shown, the bottom pieces 3 and cover pieces 4 do not undergo any deceleration. In the context of the disclosure however, a speed compensation is possible with the effect of deceleration of the bottom pieces 3 and/or cover pieces 4. In the present case, the speed jump is performed in each case on transfer from the separating device 13 to the insert device 14, or from the extraction device 16 to the joining device 17. In the context of the disclosure however, it is also possible that the respective speed jump is also achieved by corresponding rotation speed adaptation and use of a compensation play on transfer to the process wheel 15 and/or on collection from the process wheel 15.

In contrast to the insert device 14, the extraction wheels 31, 32 here for example have the same number of bottom holders 33 or cover holders 34, wherein also as an example twenty bottom holders 33 and twenty cover holders 34 are provided. A further difference from the insert device 14 (FIG. 4) is that the rotational axes 35, 36 do not lie directly between the rotational axes 47, 48 of the joining device 17 and the rotational axis 20 of the process wheel 15 (FIG. 3). Rather, they are offset laterally to these and also in the circumferential direction relative to one another. This achieves firstly that the two extraction wheels 31, 32 with the same diameter enter the action region of the joining device 17 and also the action region of the receiving rings 21, 22 situated on the different radii $r_1$, $r_2$. Secondly, the offset of the rotational axes 35, 36 ensures that each cover piece 4 is again supplied or assigned to its original bottom piece 3. It has already been described in connection with FIG. 4 that the bottom pieces 3 precede their assigned cover pieces 4 by two places. This lead is reversed again by the arrangement and configuration of the extraction wheels 31, 32 shown. The same effect can also be achieved however in the context of the disclosure by a different positioning of the rotational axes 35, 36 of the extraction wheels 31, 32 with different diameters and different numbers of bottom holders 33 and cover holders 34.

Figure 7:
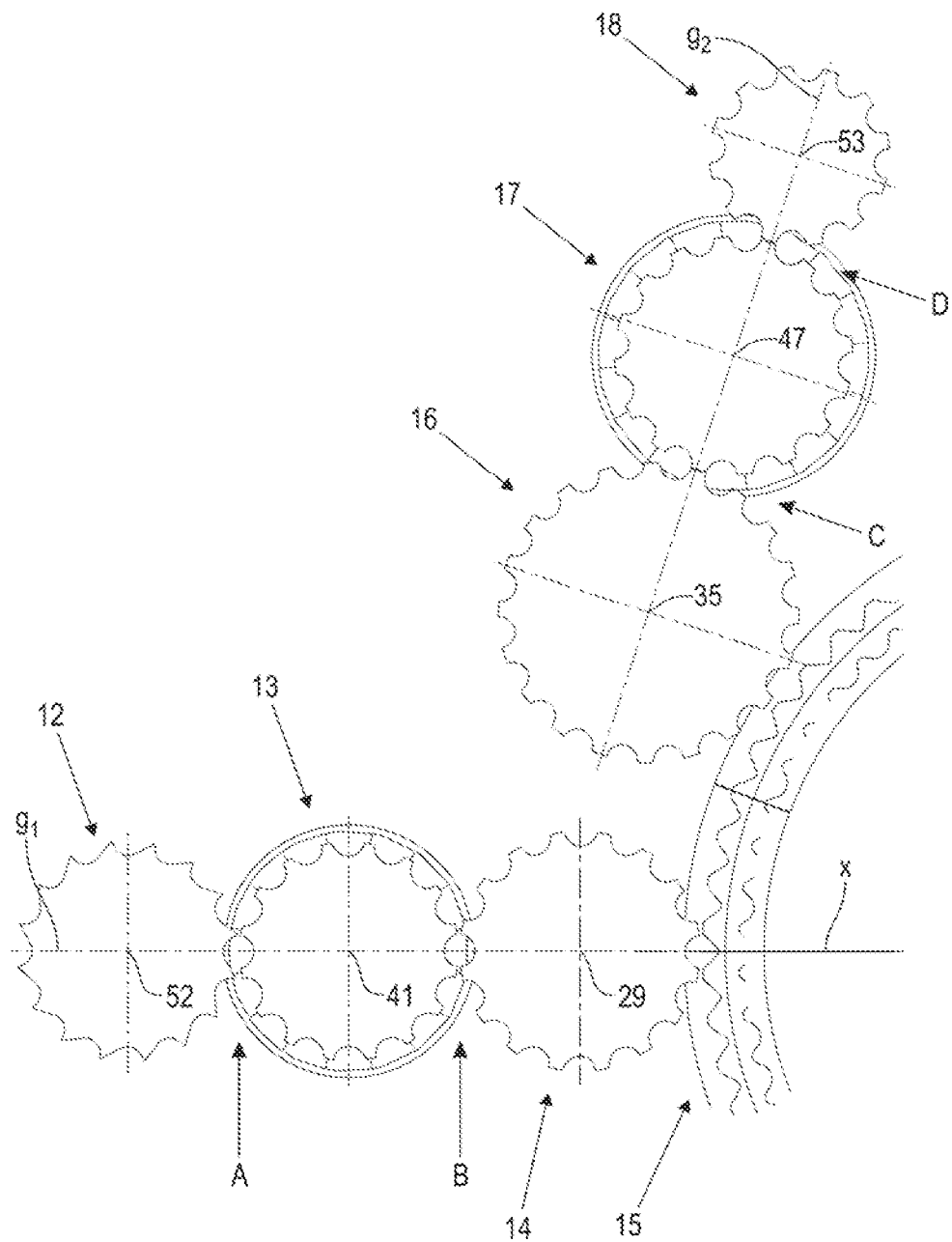
FIG. 7 shows in a top view an extract from the device from FIG. 3 with details of the relative positioning of the supply wheel, separating wheel and insert wheel, and the relative positioning of the extraction wheel, joining wheel and transfer wheel.

FIG. 7 shows in a top view an extract of the device from FIG. 3 in the region of the supply wheel 12, the separating device 13, the insert device 14, the extraction device 16, the joining device 17 and the transfer wheel 18. The supply wheel 12 has a rotational axis 52 and is arranged functionally in front of the separating device 13. The insert device 14 functionally follows the separating device 13. In other words, the objects 1 (FIGS. 1 to 3) first pass through the supply wheel 12, then the separating device 13 and then the insert device 14. Of the separating device 13, here only the first lower separating wheel 37 with its rotational axis 41 is shown, while of the insert device 14, the first lower insert wheel 25 with the associated rotational axis 29 is shown. There are also locations A and B, the function of which is described in more detail below in connection with FIG. 8. The rotational axis 52 of the supply wheel 12, the rotational axis 41 of the lower separating wheel 37, the locations A, B and the rotational axis 29 of the lower insert wheel 25, lie on a straight connecting line $g_1$. A combined view with FIG. 4, however, also shows that the rotational axis 42 of the upper separating wheel 38 and the rotational axis 30 of the upper insert wheel 26 also lie on this straight connecting line $g_1$.

Accordingly, the same applies to the extraction device 16, the joining device 17 and the transfer wheel 18: the extraction device 16 is arranged functionally in front of the joining device 17. The transfer wheel 18 has a rotational axis 53 and is arranged functionally in front of the joining device 17. In other words, the objects 1 (FIGS. 1 to 3) first pass through the extraction device 16, then the joining device 17 and then the transfer wheel 18. Of the extraction device 16, here only the first lower extraction wheel 31 with associated rotational axis 35 is shown, while of the joining device 17, only the first lower joining wheel 43 with its rotational axis 47 is shown. There are also locations C and D, the function of which is described in more detail below in connection with FIG. 9. The rotational axis 53 of the transfer wheel 18, the rotational axis 47 of the lower joining wheel 43, the locations C, D and the rotational axis 35 of the lower extraction wheel 31, lie on a straight connecting line $g_2$. A combined view with FIGS. 6 and 9 shows that the rotational axis 48 of the upper joining wheel 44 also lies on this straight connecting line $g_2$.

Figure 8:
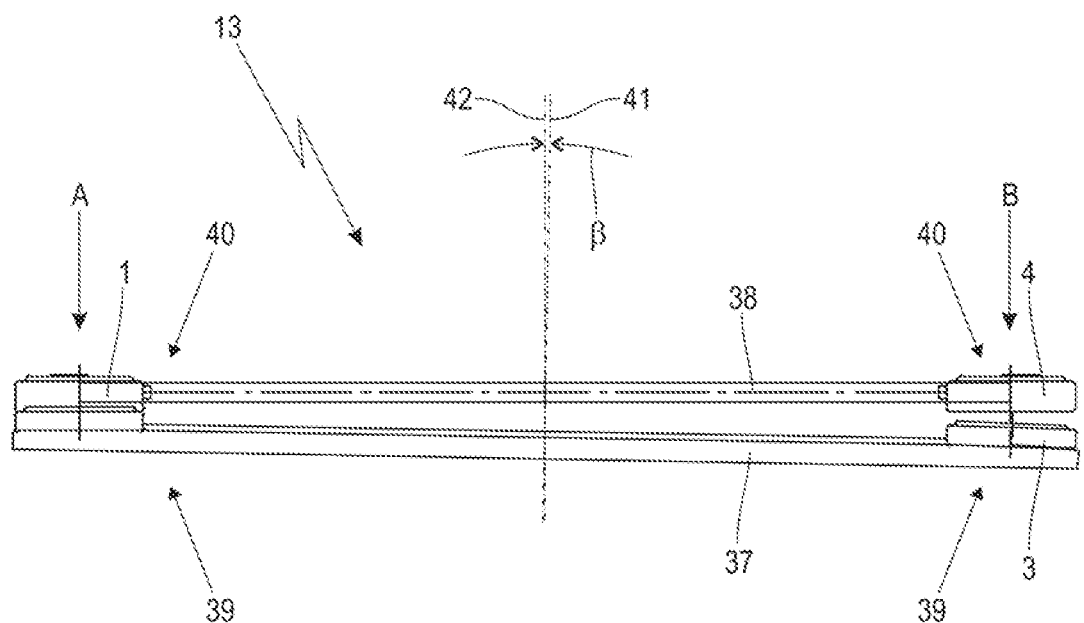
FIG. 8 shows in a side view the separating device from FIG. 3 with two separating wheels standing at a tilt angle to one another; and, FIG. 9 shows in a side view the joining device from FIG. 3 with two joining wheels standing at a tilt angle to one another.

FIG. 8 shows in a side view the separating device 13 from FIG. 3 with two separate wheels 37, 38. As already mentioned above, the associated rotational axes 41, 42 run approximately vertically. This means that at least one of the two rotational axes 41, 42 does not lie precisely vertically. In the present case, the rotational axis 42 of the upper separating wheel 38 is vertical, while the rotational axis 41 of the lower separating wheel 37 is slightly tilted relative to the vertical. There is a tilt angle β between the two which is selected such that the lower and upper object holders 39, 40 have a minimal vertical height spacing at a location A and, opposite this relative to the rotational axes 41, 42, have a maximal vertical height spacing from one another at a location B. As a result of the axial positioning described in connection with FIG. 7 on the connecting line $g_1$, the location A of minimal vertical spacing adjoins the guide wheel 12, while the location B of the maximal vertical height spacing adjoins the insert device 14. The objects 1 in assembled state are therefore taken from the supply wheel 12 at the location A of minimal spacing, wherein the objects 1 are gripped by the lower object holders 39 at the bottom pieces 3 and by the upper object holders 40 at the cover pieces 4. In the subsequent rotational movement, the axial spacing between the lower object holders 39 and the upper object holders 40 increases up to the maximum, according to which the cover pieces 4 and bottom pieces 3 are moved apart or removed from one another primarily in the vertical direction because of the pivot movement. The tilt angle β is for example 1° and is in any case dimensioned such that the increase in axial spacing is sufficient to separate the cover pieces 4 and bottom pieces 3 completely from one another, so that the bottom pieces 3 and cover pieces 4 can be transferred to the insert device 14 separately from one another at the location B of maximal spacing. The height difference between the insert wheels 25, 26 of the insert device 14, the height difference between the two receiving rings 21, 22 of the process wheel 15, and the height differences between the extraction wheels 31, 32 of the extraction device 16, are also adapted to the resulting height offset of the cover pieces 4 relative to the bottom pieces 3.

FIG. 9 shows in a side view the joining device 17 from FIG. 3, which is constructed similarly to the separating device 13 from FIG. 8. The rotational axes 47, 48 of the two joining wheels 43, 44 are tilted to one another by a tilt angle γ. For example, the rotational axis 48 of the upper joining wheel 44 is vertical, while the rotational axis 47 of the lower joining wheel 43 is tilted slightly relative to the vertical. As a result, there is a location C with maximal vertical spacing of the lower and upper object holders 45, 46, and a location D with minimal vertical spacing of the lower and upper object holders 45, 46. Because of the axial positioning described in connection with FIG. 7 on the connecting line $g_2$, the location C of maximal vertical spacing adjoins the extraction device 16, while the location D of minimal vertical height spacing adjoins the transfer wheel 18. The lower object holders 45 collect the bottom pieces 3 from the extraction device 16 at the location of maximal spacing C. Since the rotational axis 36 of the upper extraction wheel 32 does not lie on the above-mentioned connecting line $g_2$, the upper object holders 46 do not collect the cover pieces 4, separated from the bottom pieces 3, from the extraction device 16 directly at the location of maximal spacing C but sufficiently close thereto. Along their further revolution up to location D of minimal vertical spacing, the object holders 45, 46 and hence also the bottom pieces 3 and cover pieces 4 reduce their relative spacing, such that the cover pieces 4 are placed on the bottom pieces 3 in a pivot movement to form the finished objects 1, and from there finally are transferred to the transfer wheel 18 at location D of minimal vertical spacing and supplied for further processing. The tilt angle γ is here equal to the tilt angle β according to FIG. 8 and amounts to 1° but may also be different.

It is understood that the foregoing description is that of the preferred embodiments of the invention and that various changes and modifications may be made thereto without departing from the spirit and scope of the invention as defined in the appended claims.

The invention claimed is:

1. A device for separating, treating and rejoining multipiece objects in continuous operation, wherein the objects each have a bottom piece and a cover piece which is separable from the bottom piece, the device comprising:
a process wheel configured to be driven in rotation about a rotational axis for receiving the bottom pieces and the cover pieces and for transporting the received bottom pieces and cover pieces along at least one processing station;
a separating device configured to be driven in rotation for separating the cover pieces from the bottom pieces;
an insert device configured to take the bottom pieces and the cover pieces from said separating device and insert the bottom pieces and the cover pieces in said process wheel;
said process wheel having a first lower receiving ring and a second upper receiving ring which are jointly rotatable as a unit;
said first lower receiving ring having a first radius and being arranged concentrically to the rotational axis and having a plurality of bottom receivers for the bottom pieces;
said second upper receiving ring having a second radius arranged concentrically to the rotational axis and having a plurality of cover receivers for the cover pieces;
said second radius being smaller than said first radius;
said plurality of bottom receivers being equal in number to said plurality of cover receivers;
said insert device having a first lower insert wheel with bottom holders for the bottom pieces distributed around a periphery of said first lower insert wheel, and a second upper insert wheel with cover holders for the cover pieces distributed around a periphery of said second upper insert wheel;
a wheel assembly arranged between said separating device and said process wheel;
said wheel assembly having a first lower wheel with bottom holders for the bottom pieces distributed around a periphery of said first lower wheel, and a second upper wheel with cover holders for the cover pieces distributed around a periphery of said second upper wheel; and,
at least one of said bottom holders and said cover holders in a circumferential direction of a correspondingly assigned one of said first lower wheel and said second upper wheel being larger than the correspondingly received bottom pieces or cover pieces such that, in operation, they surround the bottom pieces or cover pieces with a compensation play.

2. The device of claim 1, wherein said wheel assembly is formed by said insert device with said first lower insert wheel and said second upper insert wheel; and, at least one of said bottom holders and said cover holders in the circumferential direction of a correspondingly assigned one of said first lower insert wheel and said second upper insert wheel are larger than the correspondingly received bottom pieces or cover pieces such that, in operation, they surround the bottom pieces or cover pieces with the compensation play.

3. The device of claim 2, wherein said second upper insert wheel of said insert device and said second upper receiving ring of said process wheel are configured to be set to a same circumferential speed $v_2$ as one another and a same circumferential speed $v_0$ of said separating device; and, said cover holders of said second upper insert wheel are adapted to the size of the cover pieces without compensation play.

4. The device of claim 3, wherein said first lower insert wheel of said insert device and said first lower receiving ring of said process wheel are set to a same circumferential speed $v_1$ as one another; said bottom holders of said lower insert wheel are larger than the received bottom pieces such that in operation, they surround the bottom pieces with said compensation play; and, said separating device has object holders that are larger than the received bottom pieces such that in operation, they surround the bottom pieces with a further compensation play.

5. The device of claim 1, wherein a quantity of said cover holders of said second upper insert wheel is greater than a quantity of bottom holders of said first lower insert wheel.

6. The device of claim 1 wherein said second upper insert wheel has four times as many cover holders than said first lower insert wheel has bottom holders.

7. The device of claim 1, wherein the objects each have a vertical axis; the cover piece is removable from the bottom piece primarily in a direction of the vertical axis; said separating device has two separating wheels arranged one above another including a lower separating wheel and an upper separating wheel and each has a rotational axis; said rotational axes of said two separating wheels intersect one another and are tilted relative to one another by a tilt angle; said lower separating wheel has lower object holders for the bottom pieces distributed over a periphery of said lower separating wheel; and, said upper separating wheel has upper object holders for the cover pieces distributed over a periphery of said upper separating wheel.

8. The device of claim 7 further comprising:
a supply wheel for individual objects having a rotational axis and being arranged in front of said separating device such that in top view, said separating device has a first location A with minimal vertical spacing of said lower and upper object holders and a second location B with maximal vertical spacing of said lower and upper object holders; said first lower insert wheel and said second upper insert wheel of said insert device each having a rotational axis; and, wherein the rotational axis of said supply wheel, the rotational axes of said two separating wheels, the first location A with minimal vertical spacing of said lower and upper object holders and the second location B with maximal vertical spacing of said lower and upper object holders, and the rotational axis of at least one insert wheel, lie on a straight connecting line.

9. The device of claim 1 further comprising:
a joining device for joining together separated ones of the bottom pieces and cover pieces;
an extraction device for removing the bottom pieces and cover pieces from said process wheel and for transferring the bottom pieces and cover pieces to said joining device;
said extraction device having a first lower extraction wheel with bottom holders for the bottom pieces distributed over a periphery of said first lower extraction wheel and a second upper extraction wheel with cover holders for the cover pieces distributed over a periphery of said second upper extraction wheel;
said wheel assembly being arranged between said process wheel and said joining device; and,
said wheel assembly including said first lower wheel with bottom holders for the bottom pieces distributed over a periphery of said first lower wheel and said second upper wheel with cover holders for the cover pieces distributed over a periphery of said second upper wheel.

10. The device of claim 9, wherein said wheel assembly is formed by said extraction device with said first lower extraction wheel and said second upper extraction wheel; and, at least one of said bottom holders and said cover holders in the circumferential direction of the correspondingly assigned one of said first lower insert wheel and said second upper insert wheel are larger than the respectively received bottom pieces or cover pieces such that, in operation, they surround the bottom pieces or cover pieces with a compensation play.

11. The device of claim 10, wherein said first lower extraction wheel of said extraction device and said first lower receiving ring of said process wheel are set to a same circumferential speed $v_1$ as one another and to a same circumferential speed $v_3$ of said joining device; and, said bottom holders of said first lower extraction wheel are adapted to the size of the bottom pieces without compensation play.

12. The device of claim 11, wherein said second upper extraction wheel of said extraction device and said second upper receiving ring of said process wheel are set to a same circumferential speed $v_2$ as one another; said cover holders of said second upper extraction wheel are larger than the received cover pieces such that, in operation, they surround the cover pieces with a compensation play c; and, said joining device has upper object holders that are larger than the received cover pieces such that, in operation, they surround the cover pieces with a compensation play d.

13. The device of claim 9, wherein a quantity of said bottom holders of said first lower extraction wheel is equal to a quantity of cover holders of said second upper extraction wheel.

14. The device of claim 9, wherein the objects each have a vertical axis; the cover piece is configured to be placed on the bottom piece primarily in a direction of the vertical axis; said joining device has two joining wheels including a lower joining wheel and an upper joining wheel arranged one above another and each with a rotational axis; the rotational axes of said two joining wheels intersect one another and are tilted relative to one another by a tilt angle γ; said lower joining wheel has lower object holders for the bottom pieces distributed over a periphery of said lower joining wheel; and, said upper joining wheel has upper object holders for the cover pieces distributed over a periphery of said upper joining wheel.

15. The device of claim 14 further comprising:
a transfer wheel for individual objects having a rotational axis and arranged behind said joining device such that in top view, said joining device having a location C with maximal vertical spacing of said lower object holders and said upper object holders and a location D with minimal vertical spacing of said lower object holders and said upper object holders; said first lower extraction wheel and said second upper extraction wheel of said extraction device each have a rotational axis; and, the rotational axis of said transfer wheel, the rotational axes of said joining wheels, said location C, said location D and the rotational axis of at least one of said upper extraction wheel and said lower extraction wheel, lying on a straight connecting line.

16. The device of claim 1 further comprising an output lock station positioned in a circumferential region of said process wheel; said output lock station having a lower output lock and an upper output lock; said lower output lock being configured to be brought into active connection on the bottom pieces situated in said first lower receiving ring; and, said upper output lock being configured to be brought into active connection on the cover pieces situated in said second upper receiving ring.

17. The device of claim 16, wherein said lower output lock and the upper output lock are configured to be controlled such that the bottom pieces and the assigned cover pieces execute multiple revolutions together with said process wheel.

* * * * *